United States Patent
Brouwer et al.

(10) Patent No.: US 8,201,305 B2
(45) Date of Patent: Jun. 19, 2012

(54) HINGE FOR A MIRROR UNIT OF A MOTOR VEHICLE

(75) Inventors: Stefan Frits Brouwer, Schoonhoven (NL); Paulus Gerardus Maria van Stiphout, Woerden (NL)

(73) Assignee: MCi (Mirror Controls International) Netherlands B.V., Montfoort (NL)

( * ) Notice: Subject to any disclaimer, the term of this patent is extended or adjusted under 35 U.S.C. 154(b) by 34 days.

(21) Appl. No.: 12/438,652

(22) PCT Filed: Aug. 24, 2007

(86) PCT No.: PCT/NL2007/050416
§ 371 (c)(1),
(2), (4) Date: Jul. 12, 2010

(87) PCT Pub. No.: WO2008/023985
PCT Pub. Date: Feb. 28, 2008

(65) Prior Publication Data
US 2010/0275411 A1    Nov. 4, 2010

(30) Foreign Application Priority Data

Aug. 25, 2006 (NL) ..................................... 1032368

(51) Int. Cl.
*E05D 7/00* (2006.01)
(52) U.S. Cl. ............ 16/354; 359/841; 359/871; 16/239; 16/357; 16/362
(58) Field of Classification Search .................. 16/236, 16/238–240, 246, 354, 357, 358, 360, 361; 359/871–873, 841, 844, 838, 876, 877
See application file for complete search history.

(56) References Cited

U.S. PATENT DOCUMENTS

| 5,099,362 | A | * | 3/1992 | Mittelhauser et al. | 359/841 |
| 5,497,273 | A | * | 3/1996 | Kogita et al. | 359/843 |
| 5,886,838 | A | * | 3/1999 | Kuramoto | 359/841 |
| 6,022,113 | A | * | 2/2000 | Stolpe et al. | 359/841 |
| 6,394,616 | B1 | * | 5/2002 | Foote et al. | 359/841 |
| 7,836,553 | B2 | * | 11/2010 | Brouwer et al. | 16/354 |
| 2009/0040637 | A1 | * | 2/2009 | Lang et al. | 359/872 |

FOREIGN PATENT DOCUMENTS

| DE | 2826938 A1 | 1/1980 |
| DE | 3926891 A1 | 2/1991 |
| DE | 4108882 A1 | 9/1992 |
| WO | WO2004091974 A | 10/2004 |
| WO | WO2006091087 A | 8/2006 |

OTHER PUBLICATIONS

European Patent Office, International Search Report for PCT/NL2007/050416.

* cited by examiner

*Primary Examiner* — Chuck Y. Mah
(74) *Attorney, Agent, or Firm* — Dykema Gossett PLLC

(57) ABSTRACT

A hinge construction, suitable for a wing mirror unit for a motor vehicle, includes a first hinge part configured for mounting on the motor vehicle and a second hinge part, pivotably connected with the first hinge part via a base shaft. The second hinge part is configured to support a mirror support. In an embodiment, the base shaft is translatably connected with one of the hinge parts, the other hinge part is arranged pivotably about the base shaft, and the hinge parts cooperate via a track guide, which causes the hinge parts upon pivoting to rotate relative to each other, and a straight guide, which cases the hinge parts upon pivoting to translate relative to each other.

13 Claims, 8 Drawing Sheets

HINGE FOR A MIRROR UNIT OF A MOTOR VEHICLE

CROSS-REFERENCE TO RELATED APPLICATIONS

This application is a national stage filing based upon International Application No. PCT/NL/2007/050416, filed Aug. 24, 2007, which additionally claims priority to Netherlands Application No. 1032368, filed Aug. 25, 2006.

BACKGROUND

This invention relates to a hinge construction, in particular for a wing mirror unit of a motor vehicle, comprising a first hinge part for mounting on a motor vehicle and a second hinge part, pivotably connected therewith, for supporting a mirror support of the wing mirror unit.

Such a hinge construction is generally known and typically comprises a first hinge part which is designed as a base plate for mounting on a door of an automobile. The base plate then mostly supports a fixed base shaft of substantially upright orientation. The second hinge part typically comprises a mirror support, arranged so as to be pivotable about the base shaft. The mirror support supports the components of the wing mirror, such as a mirror adjustment mechanism with mirror glass and a mirror cap.

By means of the hinge construction, the wing mirror is operatively adjustable between a folded-in position, in which the wing mirror substantially abuts alongside the body of the motor vehicle, and a folded-out position, in which the wing mirror is oriented substantially transversely to the body of the motor vehicle.

Through this adjustability, the wing mirror can be folded in from the folded-out operating position to a folded-in position in which the mirror housing projects less far with respect to the body. In this way, for one thing, the risk of damage to the wing mirror when parking the vehicle can be reduced and the wing mirror can yield to some extent upon collision with an object.

Typically, the hinge construction comprises an electric drive mechanism with which the wing mirror is adjustable between the folded-in position and the folded-out position.

In connection with safety and aerodynamics, the wing mirror in the folded-out position is preferably placed as closely to the body as possible. To enable proper folding-in, however, it is desirable for the hinge parts to be placed at a greater lateral distance from the body, so that also a wing mirror that is of relatively thick design, upon being folded in, can still have its mirror glass ending up properly disposed alongside the body.

To resolve the contradiction between these requirements, heretofore, complex constructions have been proposed to make the base shaft adjustable transversely to the body, so that the base shaft can be adjusted between a position situated more closely to the body in the folded-out position and a position situated further away from the body in lateral direction in the folded-in position of the wing mirror.

SUMMARY

This invention contemplates an alternative construction, with which the same advantages can be achieved. In particular, the invention contemplates a simple, reliable construction with which the advantages can be achieved in a simple, operatively reliable manner.

To that end, the invention provides a hinge construction according to claim 1. By having the hinge parts cooperate via a translatable base shaft and a track guide, a path can be imposed on the hinge parts with a translation component transverse to the body of the motor vehicle, while the hinge parts pivot about a substantially upright shaft. Thus, with an elegant and simple construction, the base shaft can be adjusted transversely to the body between a position situated laterally closer to the body in the folded-out position and a position situated laterally further away from the body in the folded-in position.

An advantage of such a guide is that it can be used both with hinge parts that can be pivoted relative to each other only manually, and with hinge parts that are pivoted relative to each other using a drive mechanism.

Further, an advantage of the invention described herein is that it can be used in already existing designs of wing mirror units with only mirror adaptation.

The hinge parts are preferably connected via an (electric) drive mechanism. An advantage of the construction described here is that the motor of the drive mechanism can be fitted as desired on the part of the hinge construction to be mounted on the motor vehicle or on the part of the hinge construction to be connected with the wing mirror.

By coupling the drive mechanism disengageably with one of the hinge parts, what can be achieved is that the drive mechanism can be uncoupled when from outside a high adjusting force is exerted on the hinge construction.

The invention also relates to a wing mirror unit, in particular for a motor vehicle, comprising a hinge construction according to claim 1, wherein the first hinge part is provided with a base plate for mounting on the body of a motor vehicle and wherein the second hinge part is provided with a wing mirror, and wherein the wing mirror is adjustable during use between a folded-in position, in which the wing mirror substantially abuts along the body of the motor vehicle, and a folded-out position, in which the wing mirror is oriented substantially transversely to the body of the motor vehicle.

Further advantageous embodiments of the invention are discussed below with reference to a drawing and are set forth in the claims.

The invention will be elucidated on the basis of exemplary embodiments which are represented in a drawing.

BRIEF DESCRIPTION OF THE DRAWINGS

FIG. 7b shows a schematic bottom view of the first hinge part of FIG. 7a; and

It is noted that the figures are only schematic representations of preferred embodiments of the invention that are given by way of non-limiting exemplary embodiments. In the figures, the same or corresponding parts are designated with the same reference numerals.

DETAILED DESCRIPTION

Figure 1:
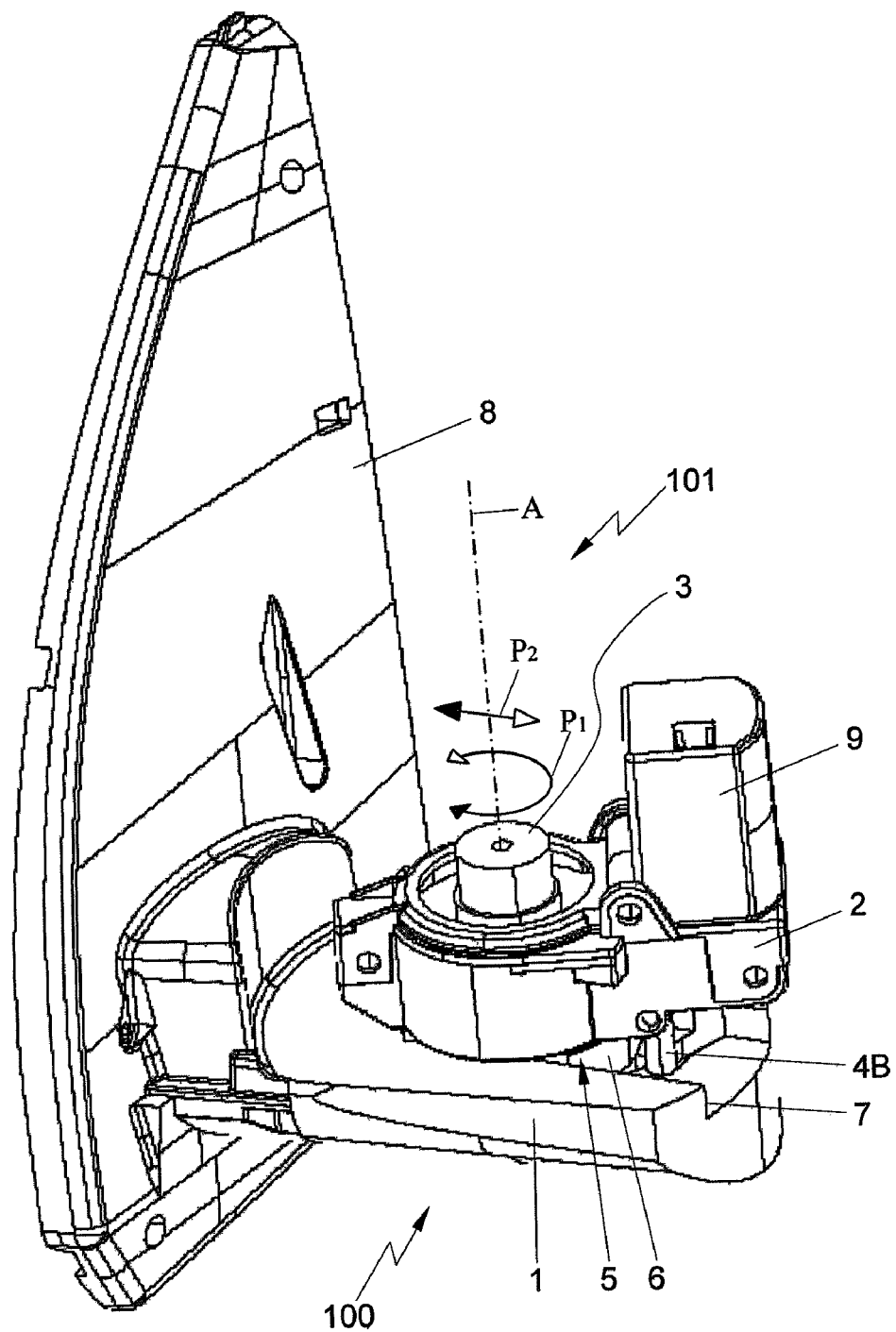
FIG. 1 shows a perspective view of a first embodiment of the hinge construction according to the invention.
Figure 2:
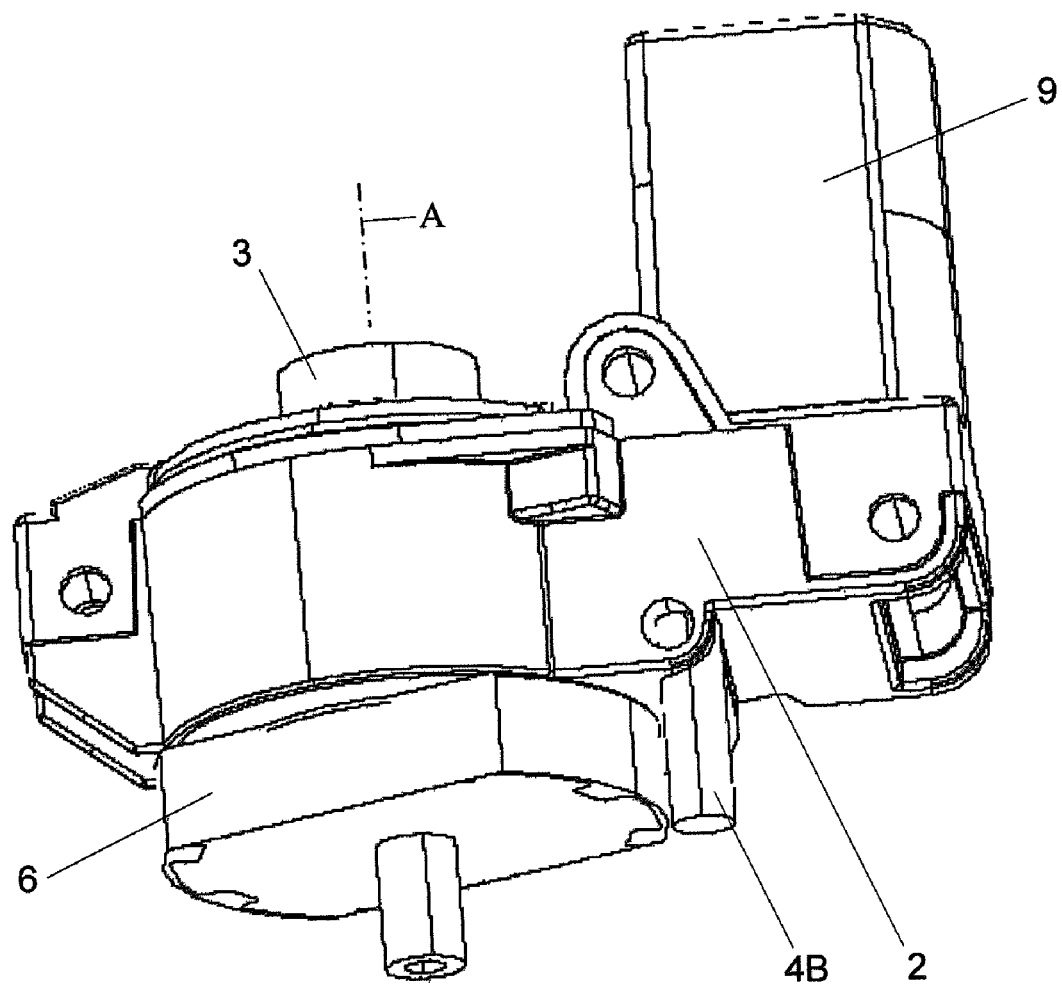
FIG. 2 shows a schematic bottom view of the base shaft with the second hinge part pivotably arranged around it.
Figure 3:
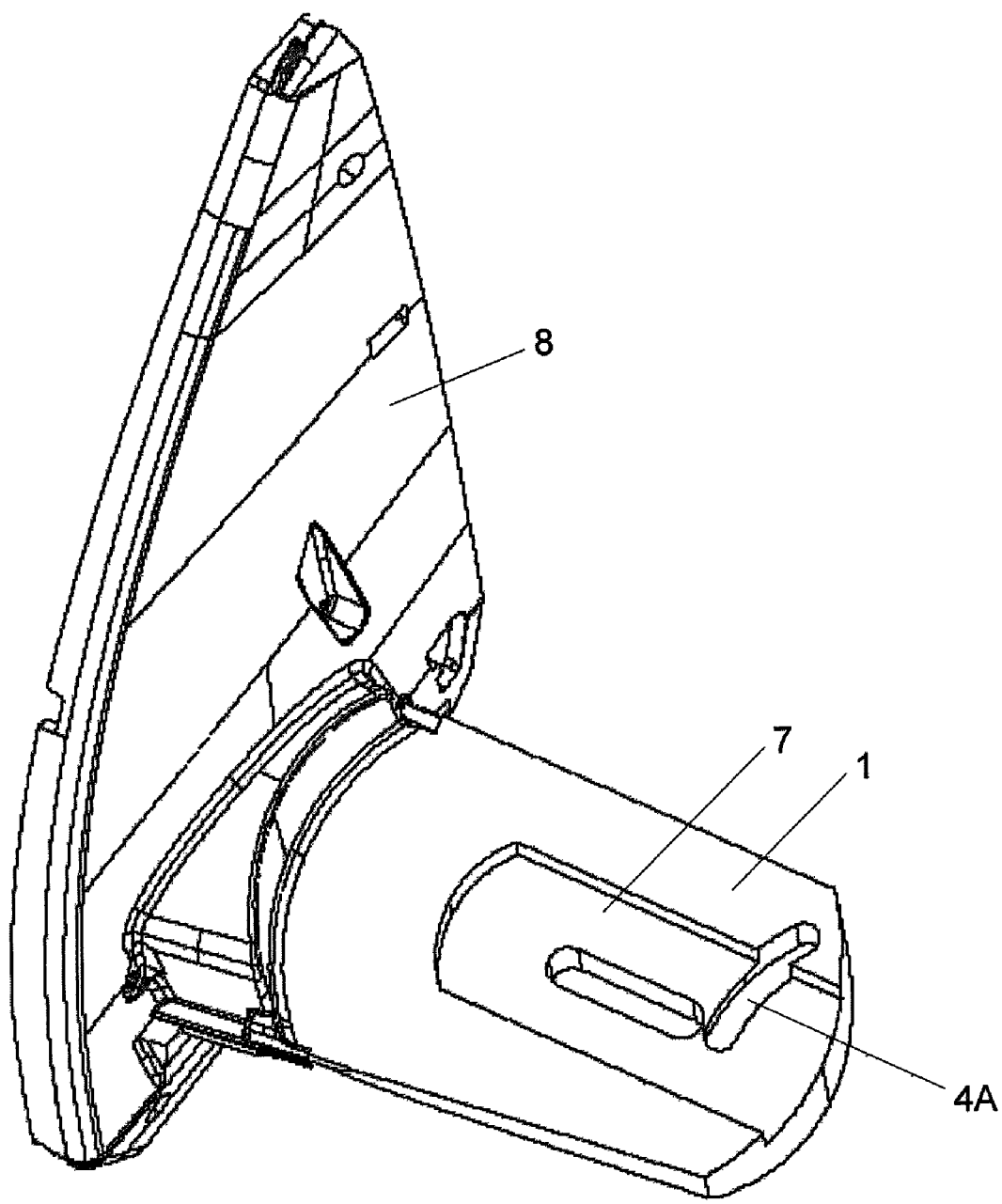
FIG. 3 shows a schematic top plan view of the first hinge part.

FIGS. 1 to 5 show a first embodiment of a hinge construction 100 for a wing mirror unit 101 for a vehicle, not shown.

The hinge construction 100 comprises a first hinge part 1 for mounting on the motor vehicle and a second hinge part 2 pivotably connected therewith via a base shaft 3, for supporting a wing mirror, not shown.

The base shaft is translatably connected with the first hinge part 1. The second hinge part 2 is arranged so as to be pivotable about the geometric longitudinal axis A of the base shaft 3.

The hinge parts 1, 2 cooperate via a track guide 4*a*, 4*b*, which causes the hinge parts 1, 2, when pivoting relative to each other, to rotate and translate. The rotation takes place about the base shaft 3, and is indicated in the figure with double-headed arrow P1. The translation takes place along the straight guide 5 included in the first hinge part 1, and is indicated with the double-headed arrow P2.

At its foot, the base shaft 3 is provided with a shoe 6 which is slidably received in a straight slot 7 in the first hinge part 1. The shoe 6 and the slot 7 here jointly form the straight guide 5.

The track guide 4 in this exemplary embodiment comprises a groove 4*a* in the first hinge part 1, which groove 4*a* (properly visible in FIG. 3) cooperates with a cooperating member 4*b*, designed as a pin (properly visible in FIG. 2) on the second hinge part 2. The cooperating member 4*b* may naturally be designed differently, for instance with one or more cams or with one or more contact rollers. The groove 4*a* may naturally be designed differently as well, for instance as a ridge or rail.

The second hinge part 2 is here located, in an axial direction of the base shaft 3, above the first hinge part 1. The hinge parts 1, 2 may be spring-biased in axial direction of the base shaft 3. This spring action may for instance be realized with a helical spring, not shown in the figure, arranged around the base shaft. Hinge parts 1, 2 are then preferably movable relative to each other in axial direction of the base shaft 3, against the direction of the spring action.

Such a spring-biased support of the hinge parts 1, 2 is sufficiently known to those skilled in the art and may for instance be used to move the hinge construction 100 apart using a stop formed by a set of run-on cams, so that the hinge construction, under the influence of an external force, can be pivoted further from a folded-out position to a folded-over position.

The first hinge part 1 and the second hinge part 2 cooperate according to the invention without rolling along each other via a guide formed by a toothed transmission.

Figure 4:
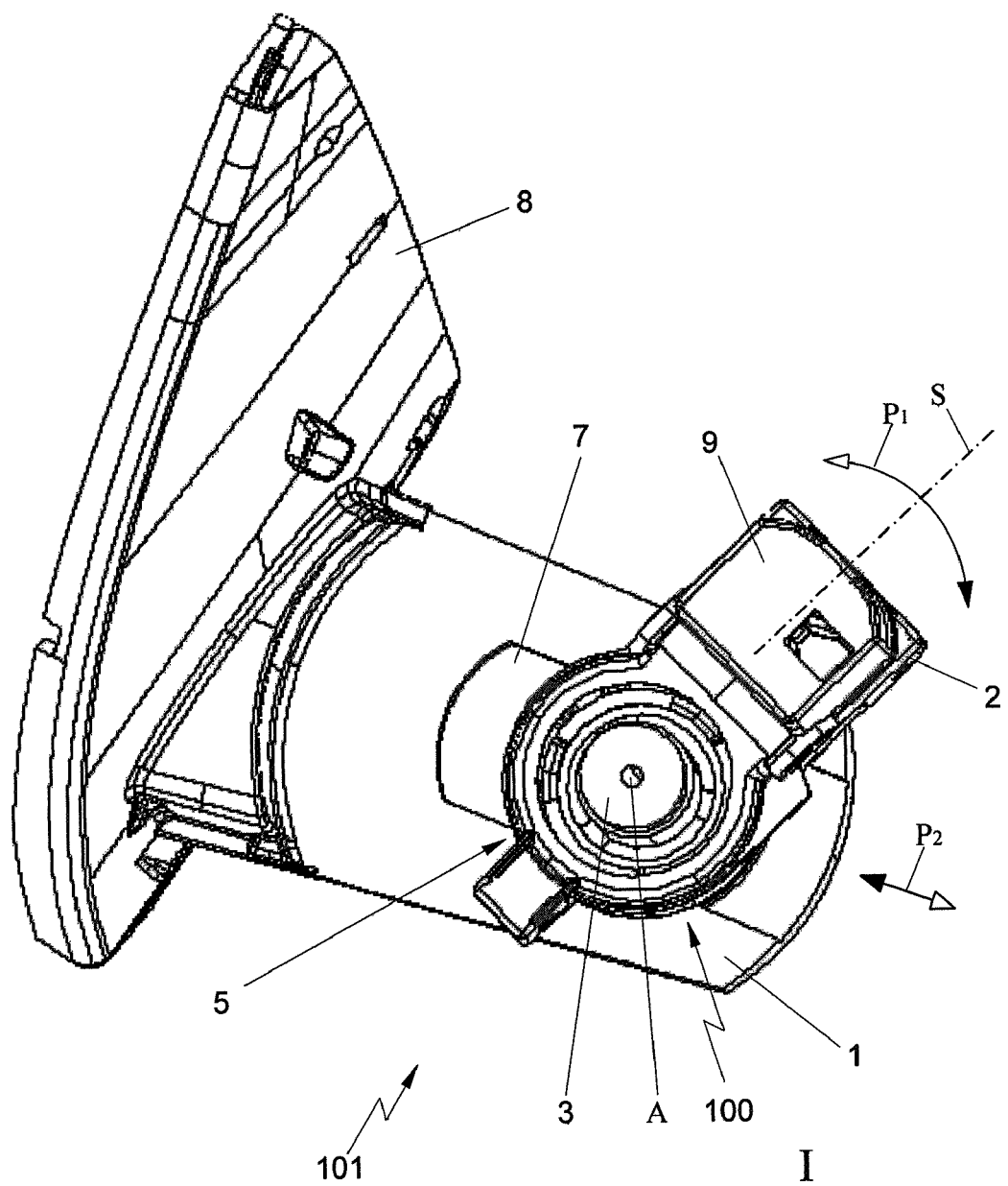
FIG. 4 shows a schematic top plan view of the hinge construction in folded-in position.
Figure 5:
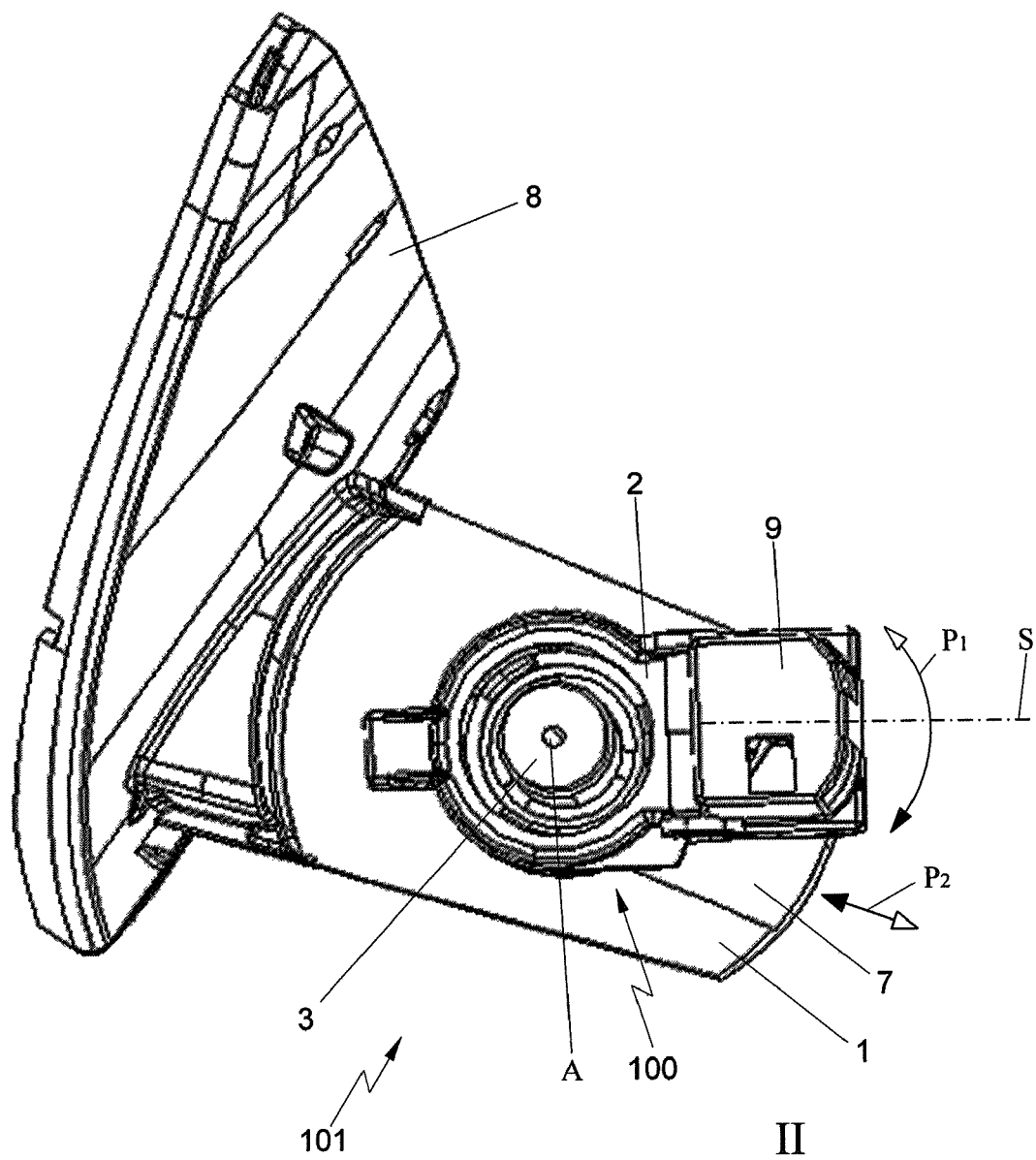
FIG. 5 shows a schematic top plan view of the hinge construction in folded-out position;p

The first hinge part 1 is provided with a base plate 8 for mounting on the body of a motor vehicle, not shown, while the second hinge part is provided with a mirror support of a wing mirror, schematically represented in FIGS. 4 and 5 by a broken line S.

The mirror support is adjustable between a folded-in position I, represented in FIG. 4, in which a wing mirror supported by the mirror support substantially abuts along the body of the motor vehicle, and a folded-out position II, in which the wing mirror is oriented substantially transversely to the body of the motor vehicle.

Upon adjustment between the folded-in position I shown in FIG. 4 and the folded-out position II shown in FIG. 5, the second hinge part 2 pivots relative to the first hinge part 1 in the direction of the closed part of the arrow P1, and the second hinge part 2 translates relative to the first hinge part 1 in the direction of the closed part of the arrow P2.

By a comparison of FIGS. 4 and 5, it can be readily seen that during the pivotal movement from the folded-in position I to the folded-out position II, the geometric longitudinal axis A moves, relative to the base plate 8, towards the base plate 8. During the opposite movement, i.e. pivotal movement from the folded-out position II to the folded-in position I, the geometric longitudinal axis A moves away from the base plate 8.

By having the hinge parts 1, 2 cooperate in this manner via a translatably arranged base shaft 3 and a track guide 4, the base shaft 3, during pivoting, can be adjusted transversely to the body between a position situated laterally closer to the body, in the folded-out position II, and a position situated laterally further away from the body, in the folded-in position I.

The second hinge part 2 is here connected with the base shaft 3 via a drive mechanism 9. Such a drive mechanism comprises for instance a drive train, coupled to the output shaft of an electric motor, which drive train drives a worm that engages the circumference of a worm wheel. Such a worm wheel is for instance coupled to the base shaft 3 so as to be axially slidable but restrained from rotation. Such a drive mechanism is sufficiently known to those skilled in the art, and may for instance be provided with a disengageable coupling which uncouples the drive mechanism from the base shaft 3 when too large an external adjustment force is exerted on the second hinge part 2.

Figure 6:
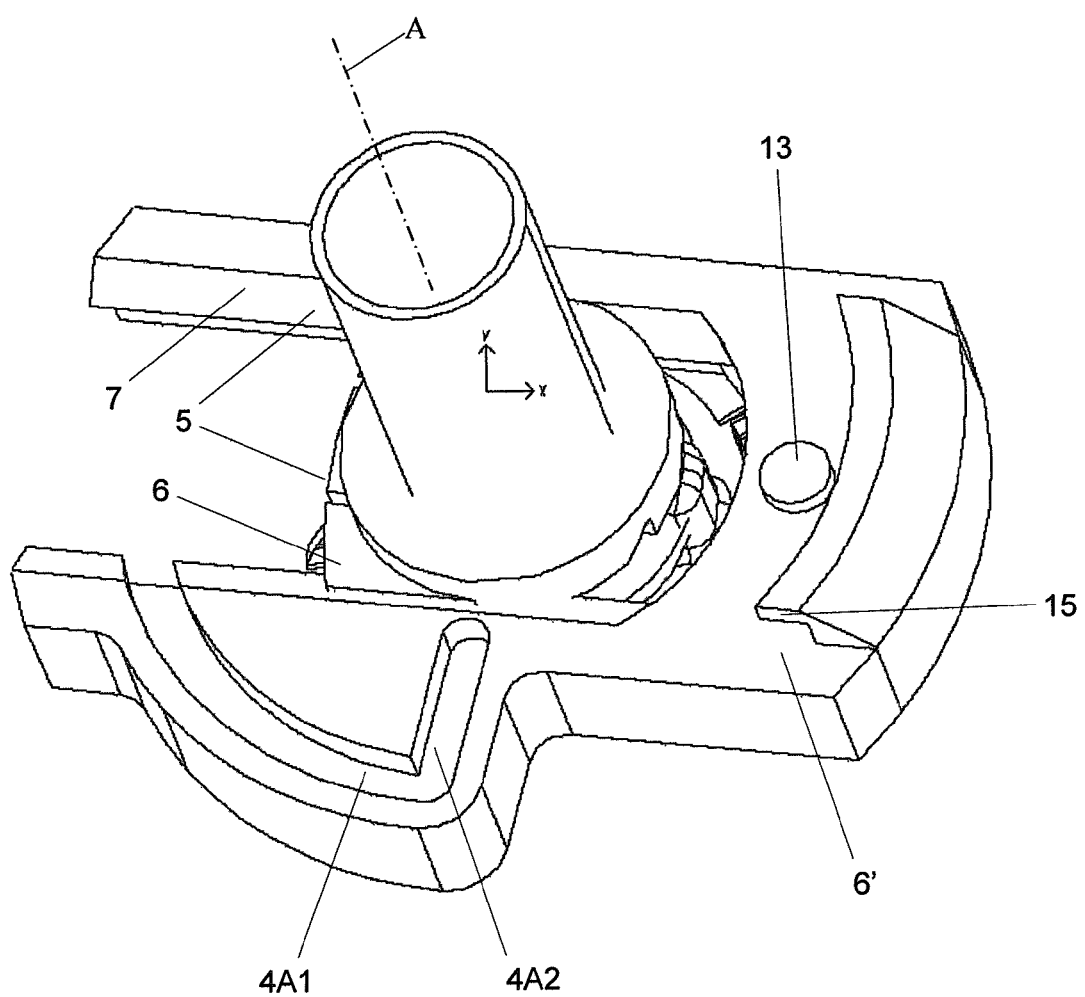
FIG. 6 shows a schematic top plan view of a second embodiment of the first hinge part.
Figure 7A:
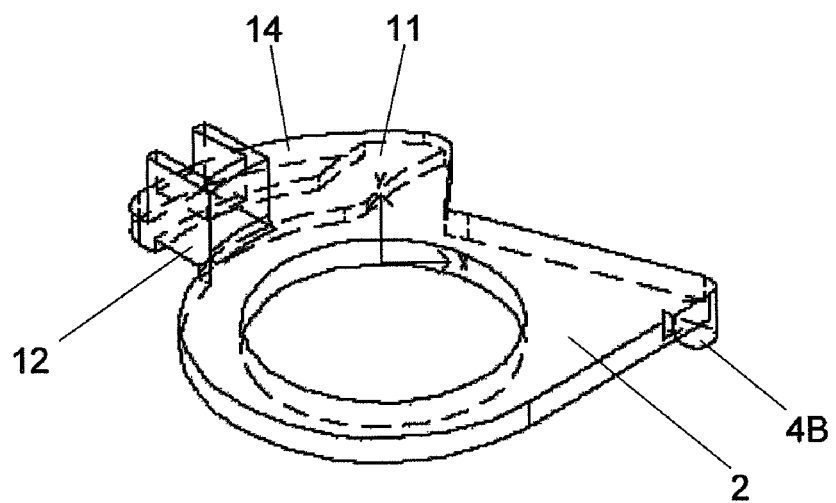
FIG. 7a shows a schematic perspective view of a second embodiment of the second hinge part.
Figure 7B:
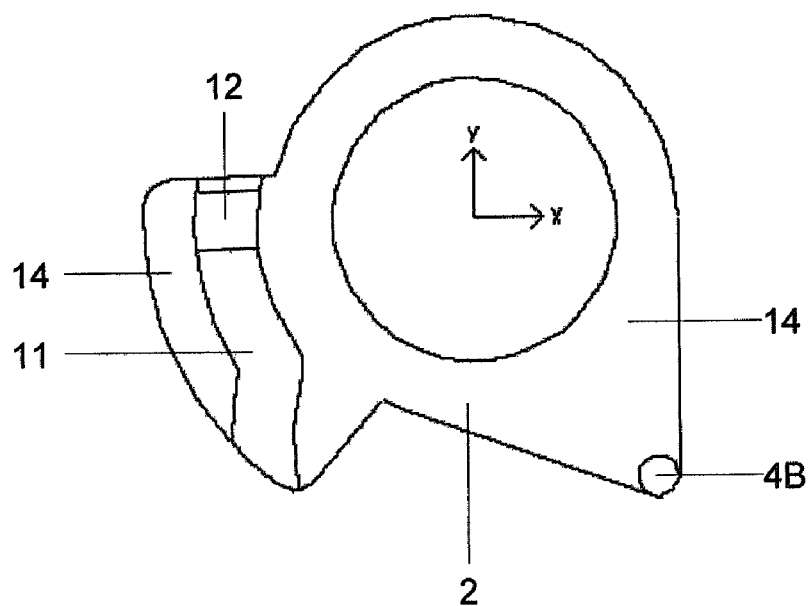
Figure 8:
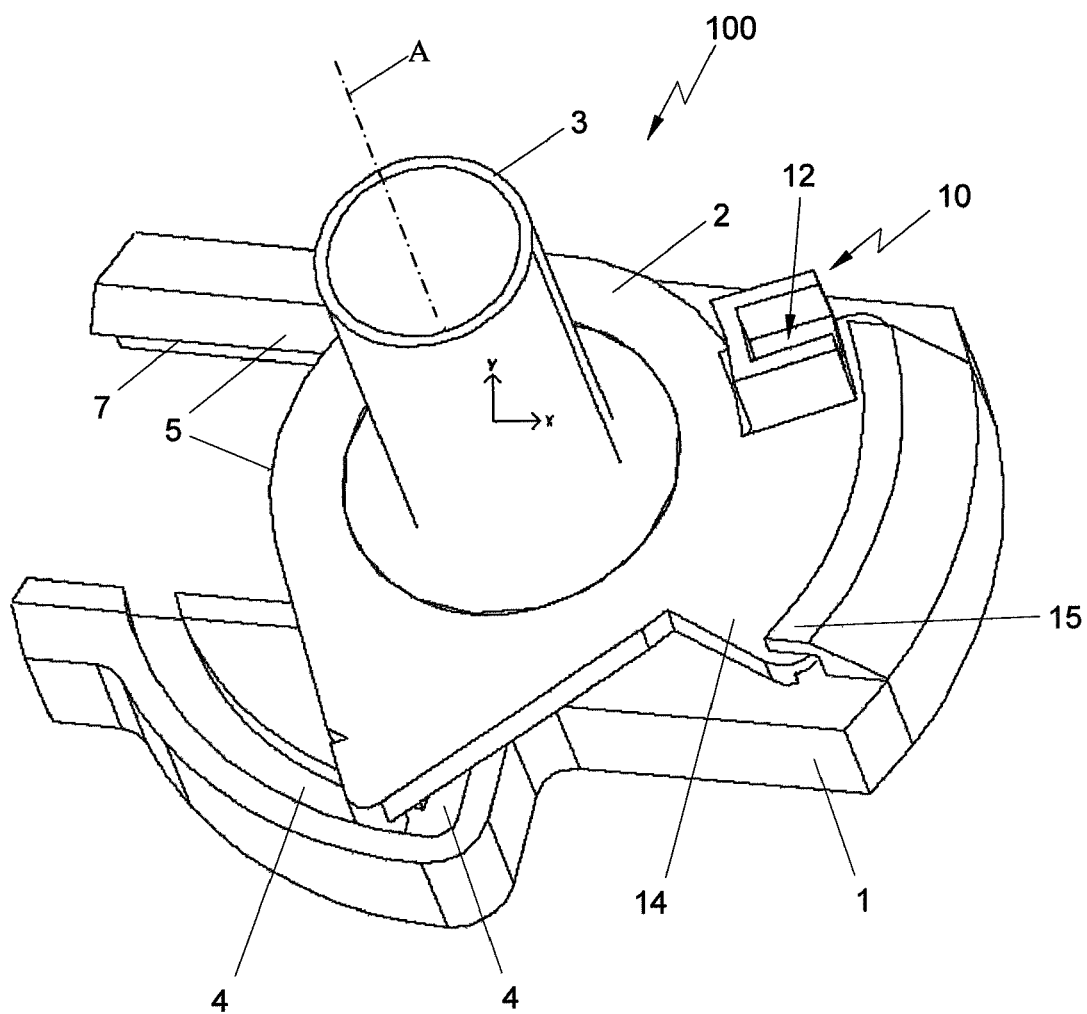
FIG. 8 shows a schematic perspective view of a second embodiment of the hinge construction according to the invention in which the first hinge part of FIG. 6 and the second hinge part of FIG. 7 cooperate.

In FIGS. 6, 7 and 8, an alternative embodiment of the hinge construction 100 is represented. In this embodiment, the track guide 4 comprises a track portion 4*a*1 extending with a substantially constant curvature, and a contiguous track portion 4*a*2 which extends substantially straight. What can thus be achieved is that rotation and translation are performed sequentially. In that case, the wing mirror supported by the mirror support can first perform a rotational movement from the folded-in position I, and then, upon reaching the end of the outward rotation stroke, proceed to translate inwards. What can be achieved in this way is that the wing mirror can be locked in the folded-out position in a simple and operatively reliable manner, using locking means 10. In this exemplary embodiment, the locking means 10 are designed as a guide track 11 of bent configuration, with an end recess 12 on the second hinge part, which cooperates with a cam 13 provided on the first hinge part 1. By having the support 14 of the guide track 11 run under a clamping edge 15, a spring action of the support 14 can be realized, and the cam 13 can be locked in the end recess 12.

The invention is not limited to the exemplary embodiments represented here. Many variations are possible within the scope of the invention as set forth in the following claims.

What is claimed is:

1. A hinge construction for a wing mirror unit for a motor vehicle comprising:
    a first hinge part configured for mounting on said motor vehicle;
    and a second hinge part, pivotably connected with the first hinge part via a base shaft, the second hinge part configured to support a mirror support,
    wherein the base shaft is translatably connected with one of the hinge parts and wherein the other hinge part is arranged pivotably about the base shaft, and wherein the hinge parts cooperate via a track guide, which causes the hinge parts upon pivoting to rotate, and a straight guide, which causes the hinge parts upon pivoting to translate relative to each other.

2. A hinge construction according to claim 1, wherein the second hinge part, in axial direction of the base shaft, is located above the first hinge part.

3. A hinge construction according to claim 1, wherein the base shaft is received in said one of the hinge parts via the straight guide.

4. A hinge construction according to claim 3, wherein the base shaft comprises a guide shoe which is slidably received in a straight slot, the guide shoe and straight slot jointly forming the straight guide.

5. A hinge construction according to claim 1, wherein the track guide comprises a ridge or groove of one of the hinge parts which cooperates with a cooperating member on the other hinge part.

6. A hinge construction according to claim 5, wherein the cooperating member comprises a cam or pin.

7. A hinge construction according to claim 5, wherein the cooperating member comprises a contact roller.

8. A hinge construction according to claim 1, wherein the hinge parts are movable relative to each other in axial direction of the base shaft.

9. A hinge construction according to claim 1, wherein the hinge parts are spring-biased in axial direction of the base shaft.

10. A hinge construction according to claim 1, wherein the track guide comprises a track portion which extends with a substantially constant curvature.

11. A hinge construction according to claim 1, wherein the track guide comprises a track portion which extends substantially straight.

12. A hinge construction according to claim 1, wherein the second hinge part arranged pivotably about the base shaft is connected with the base shaft via a drive mechanism that comprises a drive train, a worm, and a worm wheel located on the base shaft.

13. A wing mirror unit for a motor vehicle comprising:
   a hinge construction including a first hinge part configured for mounting on said motor vehicle and a second hinge part that is pivotably connected with the first hinge part via a base shaft,
   wherein the base shaft is translatably connected with one of the hinge parts and the other hinge part is arranged pivotably about the base shaft; the hinge parts cooperate via a track guide, which causes the hinge parts upon pivoting to rotate, and a straight guide, which causes the hinge parts upon pivoting to translate relative to each other; the first hinge part includes a base plate configured for mounting on a body of said motor vehicle; the second hinge part is provided with a mirror support; and the mirror support during use is adjustable between a folded-in position, in which a wing mirror supported by the mirror support substantially abuts along the body of the motor vehicle, and a folded-out position, in which the wing mirror is oriented substantially transversely to the body of said motor vehicle.

\* \* \* \* \*